July 12, 1932.  F. K. O. MOYNAN  1,867,465
STEAM DRIER OR DUST EXTRACTOR FROM GASES
Filed April 8, 1930   2 Sheets-Sheet 1
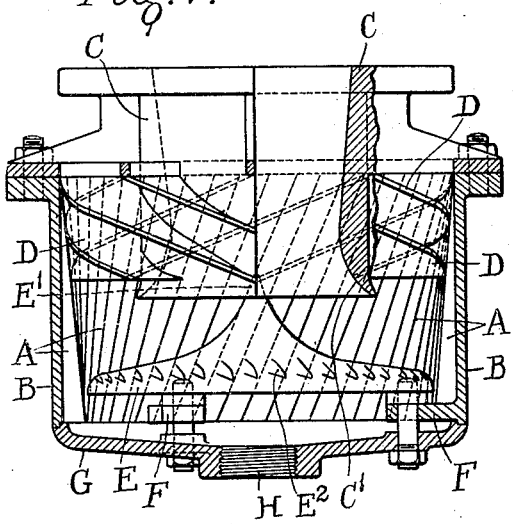
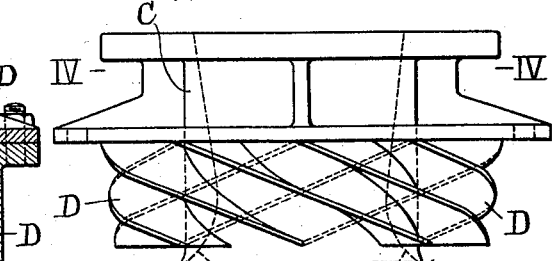
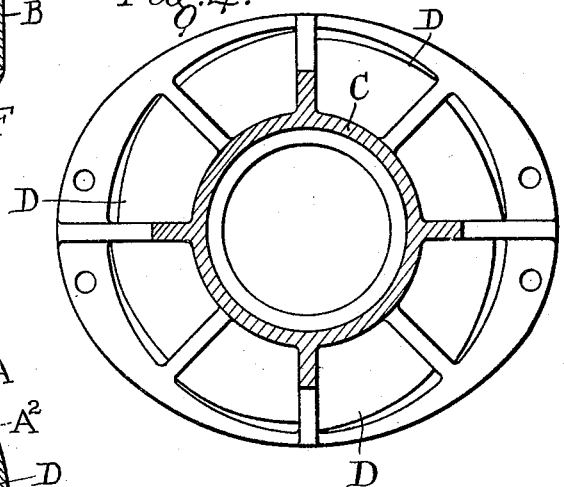
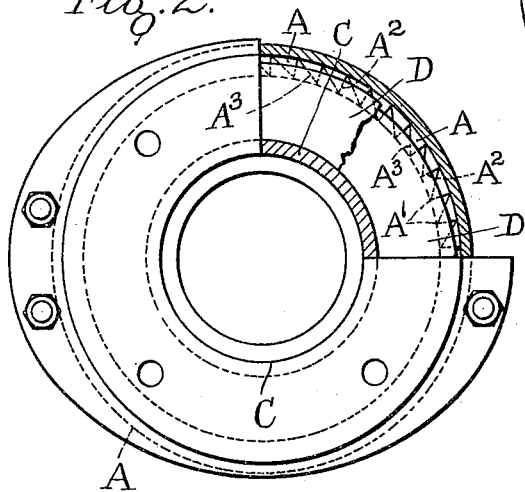
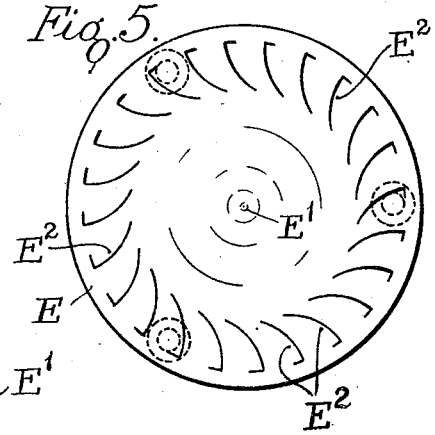
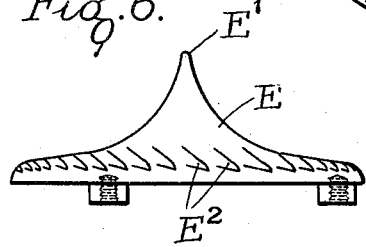
INVENTOR
Frederick K. O. Moynan
BY
ATTORNEY

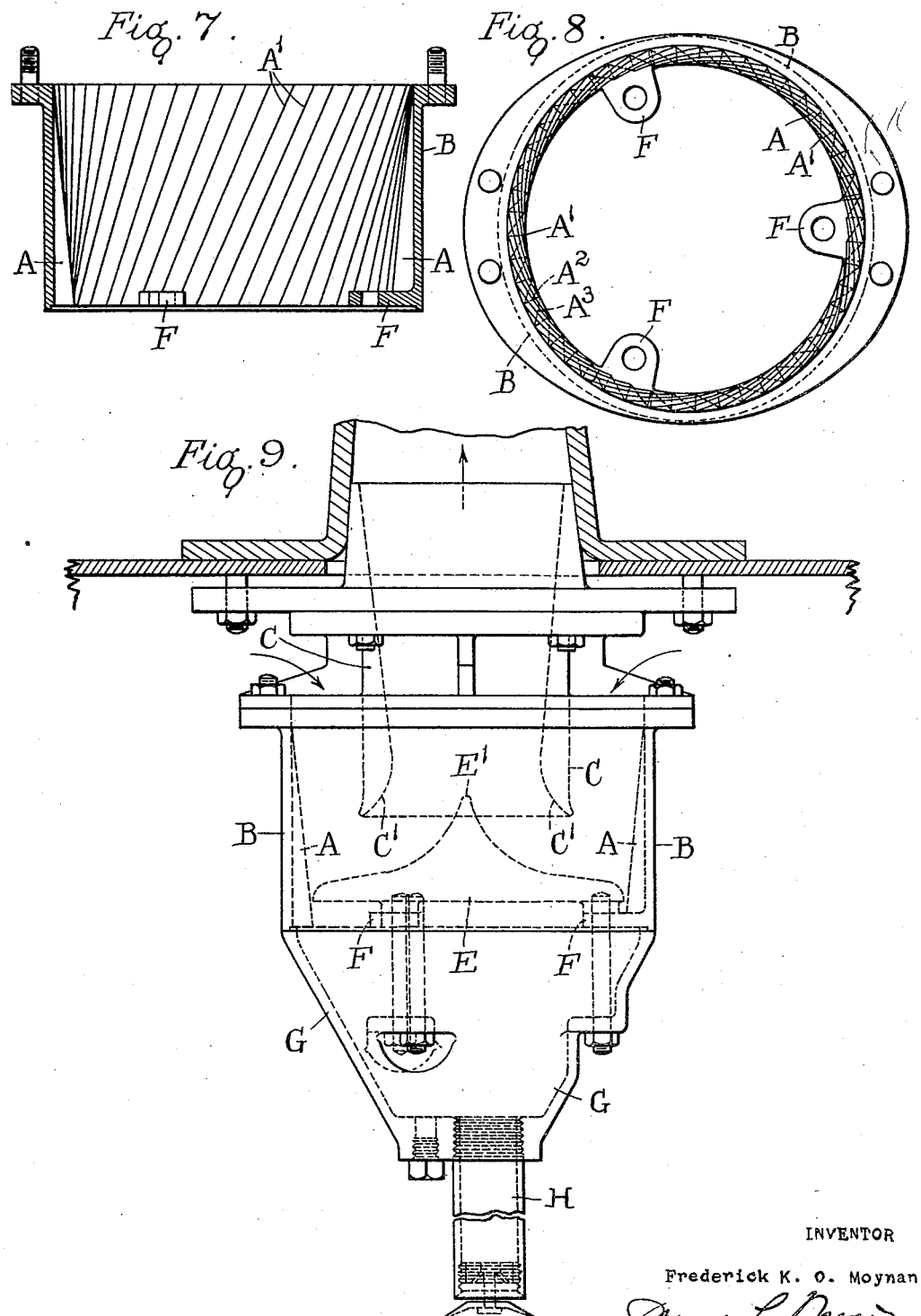

Patented July 12, 1932

1,867,465

UNITED STATES PATENT OFFICE

FREDERICK KNOX OUSELEY MOYNAN, OF KINGSTON ON SOAR, NEAR DERBY, ENGLAND

STEAM DRIER OR DUST EXTRACTOR FROM GASES

Application filed April 8, 1930, Serial No. 442,608, and in Great Britain October 18, 1929.

This invention relates to a steam drier or means to extract grit and dust from air or gases, and the like comprising a pipe having means on one end for connection to the steam outlet of a boiler or to the entrance and the outlet of a pipe connection conveying the material being treated, also holed means for carrying an inverted bell, a plate at the other end of the pipe and holes in the pipe next to the plate, helical vanes having their blades gradually decreasing in width to form a taper or spiral on the outside surrounding the pipe between the holed means and the plate, one for each hole in the holed means and the plate, an inverted bell or casing secured to the holed carrying means and having or carrying corrugations tapering on the inside edge to form a cone on the inside and touching the vanes and the plate and depending below the plate, and an outlet pipe at the bottom of the bell.

The object of this invention is to construct various improvements in combination with such class of apparatus whereby a much greater efficiency in working is obtained.

My invention consists in forming corrugations, ribs, vanes or the like forming part of or attached to the inverted bell or casing with fine edges, with one wall of each rib running radially and the other at an angle to the base of the next corrugation, rib, vane or the like, the bell having an open bottom and a cap sealing same, in combination with a bottom plate having a conical portion from the centre and a curved edge and having the upper portion of its base provided with steps, ribs, or vanes arranged radially or tangentially from a distance from the centre to the curved edge with the apex of the coned portion positioned within the mouth of the outlet pipe, the inlet portion of which is flared outwards.

My invention will be clearly understood from the following description aided by the annexed drawings in which Figure 1 is a sectional elevation of a drier or extractor embodying ring improvements and suitable for securing to the inside of the upper part of a boiler, the bottom being closed by a shallow cap.

Figure 2 is a plan of Figure 1 partly in section to show the shape of the ribs or projections within the bell or casing.

Figure 3 is a side elevation of inlet pipe and its connection and showing the spiral vanes.

Figure 4 is a section on the line IV—IV of Figure 3.

Figure 5 is a plan view of the bottom plate.

Figure 6 is a side elevation of the bottom plate.

Figure 7 is a section of the bell or casing.

Figure 8 is a plan view of the bell or casing.

Figure 9 is an elevation of a drier or extractor connected to and depending from the top of a boiler, the cap being of greater depth than that shown in Figure 1 and carrying an outlet pipe controlled by a valve.

For the purpose of my invention I construct the corrugations, ribs, vanes or the like $A$, forming part of or attached to the inside of the inverted bell or casing $B$, each with a fine edge $A^1$ having one wall $A^2$ running radially from the center, the other wall $A^3$ being positioned at an angle and preferably reaching the base of the radial wall $A^2$ of the next rib $A$, and whereby in cross section the ribs give the appearance of inwardly projecting saw teeth.

These ribs $A$ are set at an angle to the direction of rotation of the steam, air or gases to better catch the impurities and also to avoid splashing due to particles impinging at high velocity.

The outlet pipe $C$ for the purified steam, air or gases is formed as a nozzle with a "vena contracta" with the mouth or inlet portion $C^1$ flared outwards and the lower ends of the tapering deflector vanes $D$ surrounding same are positioned just above the inlet and the cone shaped bottom plate $E$ is secured to the inverted casing or bell $B$, preferably to lugs $F$ projecting inwards from the bottom of the casing $B$ which in this case has an open bottom, closable by cap or cover $G$ connectable to the lugs $F$ by bolts which also connect the plate $E$.

The coned plate $E$ is positioned at a distance from the inlet end $C^1$ of the outlet pipe $C$, and preferably with the apex $E^1$ of the cone just within the inlet $C^1$ of the pipe C, and such coned bottom plate E which is separate from the pipe C is provided with steps, ribs or vanes $E^2$ (which can be formed in the plate E or applied thereto) on the upper side and running radially or tangentially from a distance from the centre to near the edge which is curved downwards.

The bottom of the inverted casing B is in the form of a cap or cover G and may be shallow, as at Figure 1, or deep, as at Figure 9, and be affixed to the lugs F of the casing B or the bottom plate so as to allow of its removal without disturbing any other part and to allow of either a shallow or deep cover or cap being employed and such cap or cover is provided or connected with an outlet H, valve controlled or not, for allowing any impurities to pass away.

By this invention the steam, air or gases enter the openings between the helical vanes D and are rotated at high velocity, the moisture and impurities by reason of their greater weight being thrown by centrifugal force against and between the angled ribs A of the casing B, and which action is further assisted by the outward flare $C^1$ of the base of the central outlet C before turning into the same, and the grooves, steps or ribs or vanes $E^2$ on the bottom plate will catch any moisture or impurities being carried sufficiently far by the velocity to reach the bottom plate E before being thrown out and will carry them radially outwards to the edge of the plate E where, owing to the downward curvature they will run off without risk of re-entrainment and pass away, with the other moisture or impurities caught by the ribs A on the casing B, to the space between the bottom plate E and the cover G and through the outlet H in the cover G, allowing the steam, air or gases passing up the outlet pipe C to be rendered perfectly dry and free from impurities and the conical portion of the bottom plate E by having its apex $E^1$ within the outlet pipe C will in conjunction with the nozzle shaped central portion $C^1$ of the outlet C, ensure a stream like outlet for the purified steam (or gases) which will reduce the pressure drop to a minimum.

What I do claim as my invention and desire to secure by Letters Patent is:—

1. A drier or extractor of the class described having a casing interiorly conical, the inner wall of said casing having a multiplicity of substantially inclined ribs knife edged in cross section with one surface thereof radial and the other surface at an angle and reaching to the base of the next rib, a pipe member extending into the casing having tapering deflector vanes on the exterior thereof extending to said ribs and having openings between the vanes to afford inlets for the material to be treated, a conical plate supported independently of the pipe member and disposed in said casing and extending to said ribs having its base portion spaced below said pipe member and vanes, the bore of the pipe member constituting an outlet for the treated material and the apex of the conical plate being adjacent the said bore.

2. A drier or extractor of the class described having a casing interiorly conical, the inner wall of said casing having a multiplicity of ribs each arranged out of a vertical line and pointed in cross section with one surface thereof substantially radial, a pipe member extending into the casing having tapering deflector vanes on the exterior thereof extending to said ribs and having openings between the vanes to afford inlets for the material to be treated, a conical plate in said casing extending to said ribs having its base portion spaced below said pipe member, the bore of the pipe member constituting an outlet for the treated material and the apex of the conical plate being adjacent the said bore, a separable bottom plate for the casing having an outlet therethrough, said casing having inwardly extending lugs located between said plates, and fastenings extending through said lugs securing the plates and casing rigidly together.

3. A drier or extractor of the class described having a casing interiorly conical, the inner wall of said casing having a multiplicity of ribs each arranged out of a vertical line and pointed in cross section with one surface thereof substantially radial, a pipe member extending into the casing having tapering deflector vanes on the exterior thereof extending to said ribs and having openings between the vanes to afford inlets for the material to be treated, a conical plate in said casing extending to said ribs having its base portion spaced below said pipe member, said conical plate having material-engaging ribs on its upper surface adjacent its outer edge, the bore of the pipe member constituting an outlet for the treated material and the apex of the conical plate being adjacent the said bore.

In testimony whereof I have hereunto set my hand.

FREDERICK KNOX OUSELEY MOYNAN.